3,836,532
3-[(SUBSTITUTED)AMINO]-5,6-DIPHENYL-4-PYRIDAZINECARBOXYLIC ACIDS

Arthur A. Santilli, Havertown, Anthony C. Scotese, King of Prussia, and Dong H. Kim, Wayne, Pa., assignors to American Home Products Corporation, New York, N.Y.

No Drawing. Filed Oct. 30, 1972, Ser. No. 302,303
Int. Cl. C07d 51/04
U.S. Cl. 260—250 A                2 Claims

ABSTRACT OF THE DISCLOSURE

3 - [(Substituted)amino] - 5,6 - diphenyl-4-pyridazinecarboxylic acids and the esters thereof have CNS-depressant or in vitro antiamebic activity.

---

This invention relates to new and pharmacologically active 3 - [(substituted)amino] - 5,6 - diphenyl-4-pyridazinecarboxylic acids and the lower alkyl esters thereof.

The invention sought to be patented comprises chemical compounds of the formula:

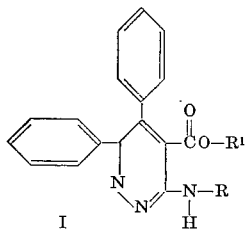

wherein R is 2-methoxyethyl, benzyl, 2-(1-pyrrolidinyl)-ethyl, or 2-(diethylamino)ethyl; and $R^1$ is lower alkyl having one to four carbons or hydrogen.

The compounds of Formula I, when R is 2-methoxyethyl, 2-(1-pyrrolidinyl)ethyl, or 2-(diethylamino)ethyl, possess CNS-depressant activity as demonstrated by evaluation in standard pharmacological test procedures. The compound of Formula I, when R is benzyl or 2-(1-pyrrolidinyl)ethyl, posses in vitro antiamebic activity, as demonstrated in standard microbiological test procedures.

The compounds of Formula I are prepared from 3-chloro-5,6-diphenyl - 4 - pyridazinecarboxylic acid, ethyl ester [British Pat. 807,548 (1959)] by the displacement of the 3-chloro atom with the appropriate amino radical. The displacement reaction is effected by treating the aforesaid compound with an appropriately substituted primary amine in an inert solvent, such as dimethylformamide, in the presence of a base, e.g. sodium carbonate. The product of the displacement reaction is the ethyl ester. If desired, the ester can be hydrolyzed by conventional procedures, e.g. 30% aqueous sodium hydroxide containing ethanol, to give the corresponding free acid. The acid can be re-esterified to give a lower alkyl ester thereof using standard esterification procedures.

The manner and processes for making and using the compounds of the invention are illustrated in the following examples:

EXAMPLE I

3-Hydroxy-5,6-Diphenyl-4-Pyridazinecarboxylic Acid, Ethyl Ester

To a sodium ethoxide solution prepared from 8.9 g. of sodium in 1-liter of absolute ethanol is added 87 g. of benzilmonohydrazone and 62.2 g. of diethyl malonate. The reaction mixture is heated under reflux with stirring for 1 hour. The volume of ethanol is reduced to 500 ml. by distillation in a rotary evaporator and the reaction mixture is then diluted to 1200 ml. with water. The addition of 200 ml. of 3 N hydrochloric acid results in the formation of a precipitate. The reaction mixture is cooled in ice and filtered to obtain 116 g. of the title compound, m.p. 218–223° C.

EXAMPLE II

3-Chloro-5,6-Diphenyl-4-Pyridazinecarboxylic Acid, Ethyl Ester

To a 400 ml. of phosphoryl chloride is added 116 g. of 3 - hydroxy-5,6-diphenyl-4-pyridazinecarboxylic acid, ethyl ester. The reaction mixture is stirred and heated under reflux for 1½ hours. The excess phosphoryl chloride is removed in vacuo in a rotary evaporator and the residual oil is poured on to ice water. The gummy residue is triturated with ethanol to afford the title compound weighing 105 g. when dried, m.p. 111–115° C.

EXAMPLE III 3-(2-Methoxyethylamino)-5,6-Diphenyl-4-Pyridazinecarboxylic Acid, Ethyl Ester A stirred mixture of 3.3 g. of 3-chloro-5,6-diphenyl-4-pyridazinecarboxylic acid ethyl ester, 1.1 g. of 2-methoxyethylamine and 1.1 g. of sodium carbonate in 20 ml. of dimethylformamide is heated under reflux for 3½ hours. The reaction mixture is filtered and a sufficient amount of water is added to the filtrate to initiate precipitation. The precipitate is collected and recrystallized first from cyclohexane and a second time from heptane to afford the title compound, m.p. 105–108° C.

Analysis for $C_{22}H_{23}N_3O_3$.—Calculated: C, 70.01; H, 6.14; N, 11.13. Found: C, 69.94; H, 6.26; N, 11.28.

EXAMPLE IV 3-(2-Methoxyethylamino)-5,6-Diphenyl-4-Pyridazinecarboxylic Acid

A mixture of 2.0 g. of 3-(2-methoxyethylamino)-5,6-diphenyl-4-pyridazinecarboxylic acid, ethyl, ester, 40 ml. of 30% sodium hydroxide solution and 10 ml. of ethanol is boiled for 5 minutes until a clear solution is obtained. The mixture is then diluted with water and acidified with concentrated hydrochloric acid to give a precipitate weighing 1.0 g., m.p. 188° C. d. Recrystallization from ethanol gives the title compound, m.p. 191–192° C. d.

Analysis for $C_{20}H_{19}N_3O_3$.—Calculated: C, 68.75; H, 5.48; N, 12.03. Found: C, 68.30; H, 5.51; N, 12.24.

EXAMPLE V

3-Benzylamino-5,6-Diphenyl-4-Pyridazinecarboxylic Acid, Ethyl Ester

A stirred mixture of 3.3 g. of 3-chloro-5,6-diphenyl-4-pyridazinecarboxylic acid, ethyl ester, 1.6 g. of benzylamine and 1.1 g. of sodium carbonate in 20 ml. of dimehylformamide is heated under reflux for 1.5 hours. and then filtered. Water is added to start precipitation. The precipitate is collected and recrystallized twice from ethanol giving the title compound, m.p. 167–169° C.

Analysis for $C_{26}H_{23}N_3O_2$.—Calculated: C, 76.26; H, 5.66; N, 10.26. Found: C, 76.50; H, 5.75; N, 10.40.

EXAMPLE VI

3-Benzylamino-5,6-Diphenyl-4-Pyridazinecarboxylic Acid

A mixture of 10 g. of 3-benzylamino-5,6-diphenyl-4-pyridazinecarboxylic acid, ethyl ester, 100 ml. of 30% sodium hydroxide solution and 25 ml. of ethanol is heated under reflux for 10 minutes. The mixture is then acidified and the precipitate which results is collected and washed with water. The solid is recrystallized from Cellosolve-ethanol to afford 4.8 g. of the title compound, m.p. 207–208° C. d.

*Analysis for* $C_{24}H_{19}N_3O_2$.—Calculated: C, 75.57; H, 5.02; N, 11.02. Found: C, 75.80; H, 5.26; N, 11.07.

EXAMPLE VII 5,6-Diphenyl-3-[2-(1-Pyrrolidinyl)Ethyl] Amino-4-Pyridazinecarboxylic Acid A stirred mixture of 13.2 g. of 3-chloro-5,6-diphenyl-4-pyridazinecarboxylic acid, ethyl ester, 4.56 g. of 2-(N-pyrrolidino)ethyl amine and 4.24 g. of sodium carbonate in 40 ml. of dimethylformamide is heated under reflux for 4 hours. The reaction mixture is filtered and the filtrate diluted with water and extracted with ether (2× 100 ml.). The ether phase is dried over $MgSO_4$; filtered and evaporated to dryness *in vacuo*. The residual brown oil is treated with 100 ml. of boiling 30% sodium hydroxide solution. The resulting solution is cooled and neutralized with dilute sulfuric acid. The precipitate is collected, washed with water and recrystallized from ethanol to give 5.5 g. of the title compound, m.p. 254–255° C. d.

*Analysis for* $C_{23}H_{24}N_4O_2$.—Calculated: C, 17.11; H, 6.23; N, 14.42. Found: C, 70.75; H, 6.15; N, 14.39.

EXAMPLE VIII

3-[2-(Diethylamino)Ethyl]Amino-5,6-Diphenyl-4-Pyridazinecarboxylic Acid, Ethyl Ester A stirred mixture of 3.3 g. of 3-chloro-5,6-diphenyl-4-pyridazinecarboxylic acid, ethyl ester, 1.2 g. of N,N-diethylethylenediamine and 1.1 g. of sodium carbonate in 20 ml. of dimethylformamide is heated under reflux for 4 hours. The reaction mixture is filtered and water is added to the filtrate. An oil is deposited which is removed by extraction with ether. The ether solution is evaporated to dryness leaving a brown oily residue which crystallizes on standing. This material on recrystallization from pentane gives the title compound, m.p. 67–70° C.

*Analysis for* $C_{25}H_{30}N_4O_2$.—Calculated: C, 71.74; H, 7.23; N, 13.39. Found: C, 71.96; H, 7.20; N, 13.37.

EXAMPLE IX

The CNS-depressant activity of the compounds can be demonstrated and elicited by using the following test procedure:

The compound is administered intraperitoneally (I.P.) to three mice, and the animals are observed for signs of CNS-depressant activity, such as decreased motor activity, decreased respiration, sedation, and ataxia. When tested as described above, the following compounds gave results as follows:

(a) 3-(2 - methoxyethylamino)-5,6-diphenyl-4-pyridazinecarboxylic acid: decreased motor activity at 12.7 mg./kg. (I.P.), decreased respiration at 127 mg./kg. (I.P.).

(b) 5,6-diphenyl-3-[2-(1 - pyrrolidinyl)ethyl]-amino-4-pyridazinecarboxylic acid: decreased respiration at 40 mg./kg. (I.P.), decreased respiration at 127 mg./kg. (I.P.).

The *in vitro* antiamebic activity of the compounds can be evaluated according to the following procedure:

The test compound is incorporated and diluted in an aqueous phase of modified Boeck-Drbohlav diphasic medium fortified with rice starch. The medium is inoculated with polybacteria and a known number of trophozoites of *E. histolytica* NIH 200. After 48 hours inoculation, the trophozoites are counted. When tested in the above manner, 3-benzylamino-5,6-diphenyl-4-pyridazinecarboxylic acid and 5,6-diphenyl-3-[2 - (1 - pyrrolidinyl)ethyl] amino-4-pyridazinecarboxylic acid killed *E. histolytica* at a concentration of 250 μg./ml.

When the compounds of the invention are employed as depressants of the central nervous system, they may be administered alone or in combination with pharmaceutically acceptable carriers, the proportion of which is determined by the solubility and chemical nature of the compound, chosen route of administration, and standard pharmaceutical practice. For example, they may be administered orally in the form of tablets or capsules containing such excipients as starch, lactose, magnesium stearate, and so forth. They may be administered orally in the form of solution or they may be injected parenterally, e.g. intramuscularly. For parenteral administration, they may be used in the form of a sterile solution or suspensions containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a dosage level that will generally afford effective results without causing any harmful or deleterious side effects.

What is claimed is:

1. The compound which is 5,6-diphenyl-3-[2-(1-pyrrolidinyl)ethyl]amino-4-pyridazinecarboxylic acid and the lower alkyl esters thereof, said lower alkyl group having from 1 to 4 carbons.

2. The compound as defined in Claim 1, which is 5,6-diphenyl-3-[2-(1 - pyrrolidinyl)ethyl]amino-4-pyridazinecarboxylic acid.

References Cited

FOREIGN PATENTS

| 868,462 | 5/1961 | Great Britain | 260—250 A |
| 89,755 | 11/1958 | Netherlands | 260—250 A |

OTHER REFERENCES

Nambaru, Chemicals Abstracts 72: 87423y.

DONALD G. DAUS, Primary Examiner

R. McCLOUD, Assistant Examiner

U.S. Cl. X.R.

424—250